US012011830B2

(12) United States Patent
Kwon et al.

(10) Patent No.: US 12,011,830 B2
(45) Date of Patent: Jun. 18, 2024

(54) POSITIONING ARM

(71) Applicants: ROEN Surgical, Inc., Daejeon (KR); KOREA ADVANCED INSTITUTE OF SCIENCE AND TECHNOLOGY, Daejeon (KR)

(72) Inventors: Dong Soo Kwon, Daejeon (KR); Chang Kyun Kim, Daejeon (KR); Byung Sik Cheon, Daejeon (KR)

(73) Assignees: ROEN Surgical, Inc., Daejeon (KR); KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 221 days.

(21) Appl. No.: 17/427,081

(22) PCT Filed: Aug. 7, 2019

(86) PCT No.: PCT/KR2019/009856
§ 371 (c)(1),
(2) Date: Jul. 29, 2021

(87) PCT Pub. No.: WO2020/159021
PCT Pub. Date: Aug. 6, 2020

(65) Prior Publication Data
US 2022/0097226 A1 Mar. 31, 2022

(30) Foreign Application Priority Data
Jan. 31, 2019 (KR) ........................ 10-2019-0012993

(51) Int. Cl.
*B25J 9/10* (2006.01)
*B25J 18/02* (2006.01)

(52) U.S. Cl.
CPC ............. *B25J 9/102* (2013.01); *B25J 9/1065* (2013.01); *B25J 18/02* (2013.01)

(58) Field of Classification Search
CPC ........... B25J 9/102; B25J 9/1065; B25J 18/02
See application file for complete search history.

(56) References Cited

U.S. PATENT DOCUMENTS 5,397,323 A * 3/1995 Taylor .................... A61B 34/71
901/41
2004/0024385 A1* 2/2004 Stuart .................... B25J 9/1065
606/1

(Continued)

FOREIGN PATENT DOCUMENTS

JP 2007290096 11/2007
KR 20110123012 11/2011

(Continued)

OTHER PUBLICATIONS

English translation of Korean reference 10-1787265, Chung, Oct. 2017.*

(Continued)

*Primary Examiner* — William C Joyce
(74) *Attorney, Agent, or Firm* — JCIPRNET

(57) ABSTRACT

A positioning arm including a link assembly including a translation link configured to translationally move along a virtual axis passing a remote center of motion (RCM) present at a predetermined position separated from one point and configured to move in at least two directions based on the one point, and a gravity torque compensator configured to provide a compensation torque in a direction opposite to a gravity torque applied to the one point by a self-weight of the link assembly.

13 Claims, 12 Drawing Sheets

(56) References Cited

U.S. PATENT DOCUMENTS

2012/0143212 A1 6/2012 Madhani et al.
2015/0351857 A1 12/2015 Ander et al.

FOREIGN PATENT DOCUMENTS

| KR | 20130069547 | 6/2013 |
| KR | 101787265 | 10/2017 |
| KR | 101801242 | 11/2017 |
| KR | 101903904 | 11/2018 |
| KR | 102034950 | 10/2019 |
| WO | WO 2017/077755 A1 * | 5/2017 |

OTHER PUBLICATIONS

Changhyun Cho et al., "Static balancing of a manipulator with hemispherical work space," 2010 IEEE/ASME International Conference on Advanced Intelligent Mechatronics, Jul. 2010, pp. 1269-1274.

Chang Kyun Kim et al., "Three-Degrees-of-Freedom Passive Gravity Compensation Mechanism Applicable to Robotic Arm With Remote Center of Motion for Minimally Invasive Surgery," IEEE Robotics and Automation Letters, vol. 4, Oct. 2019, pp. 3473-3480.

* cited by examiner

[Fig. 5]
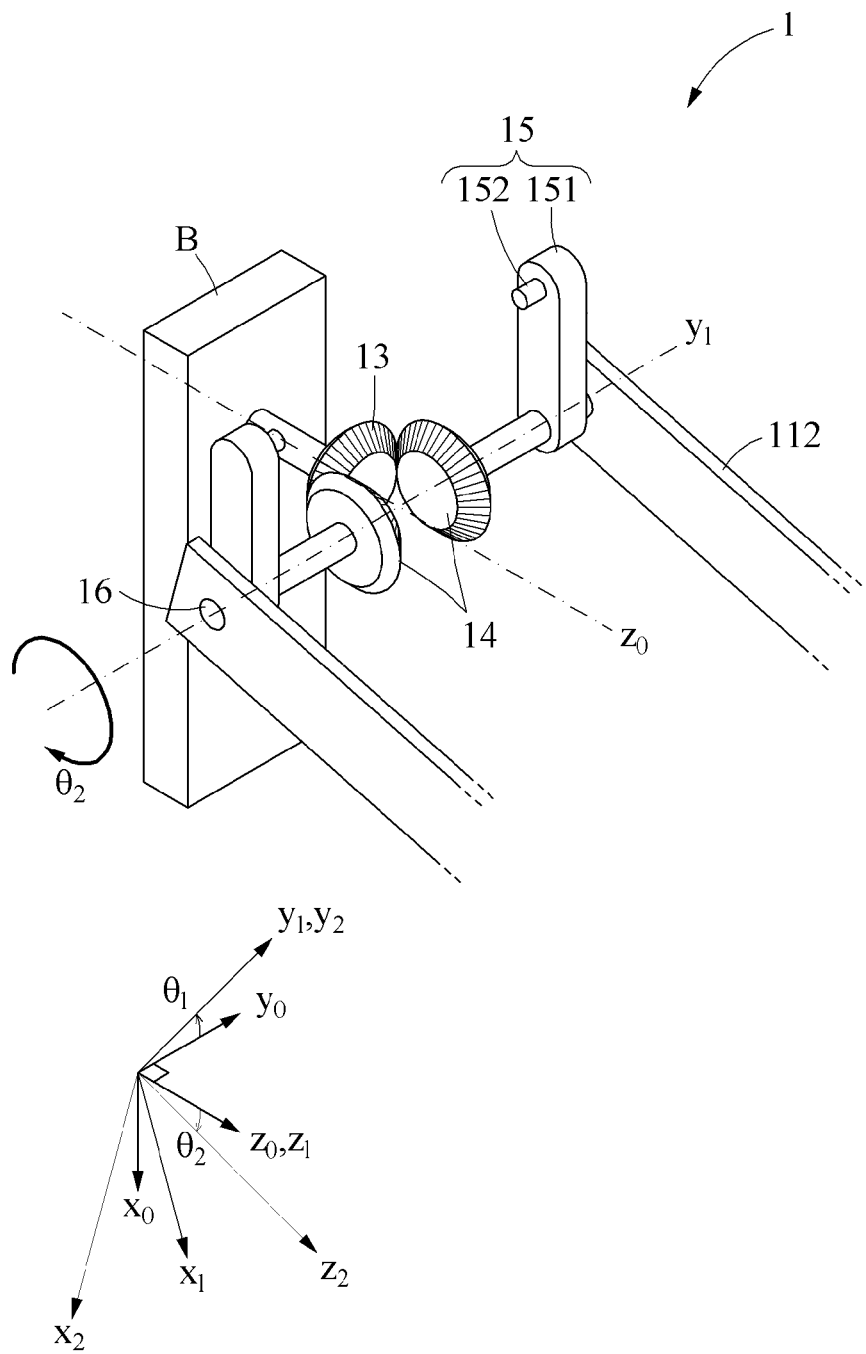

[Fig. 6]
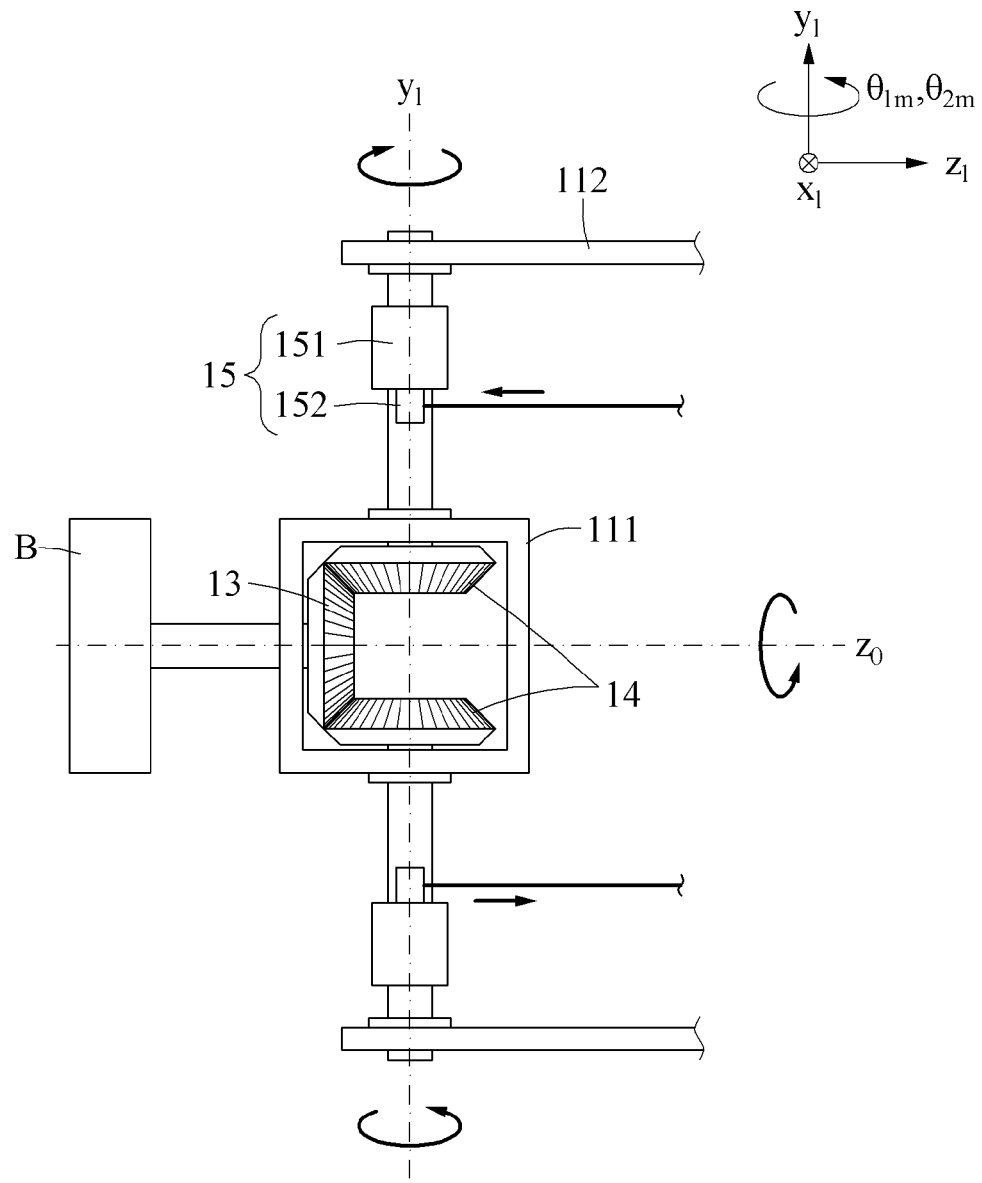

[Fig. 7]
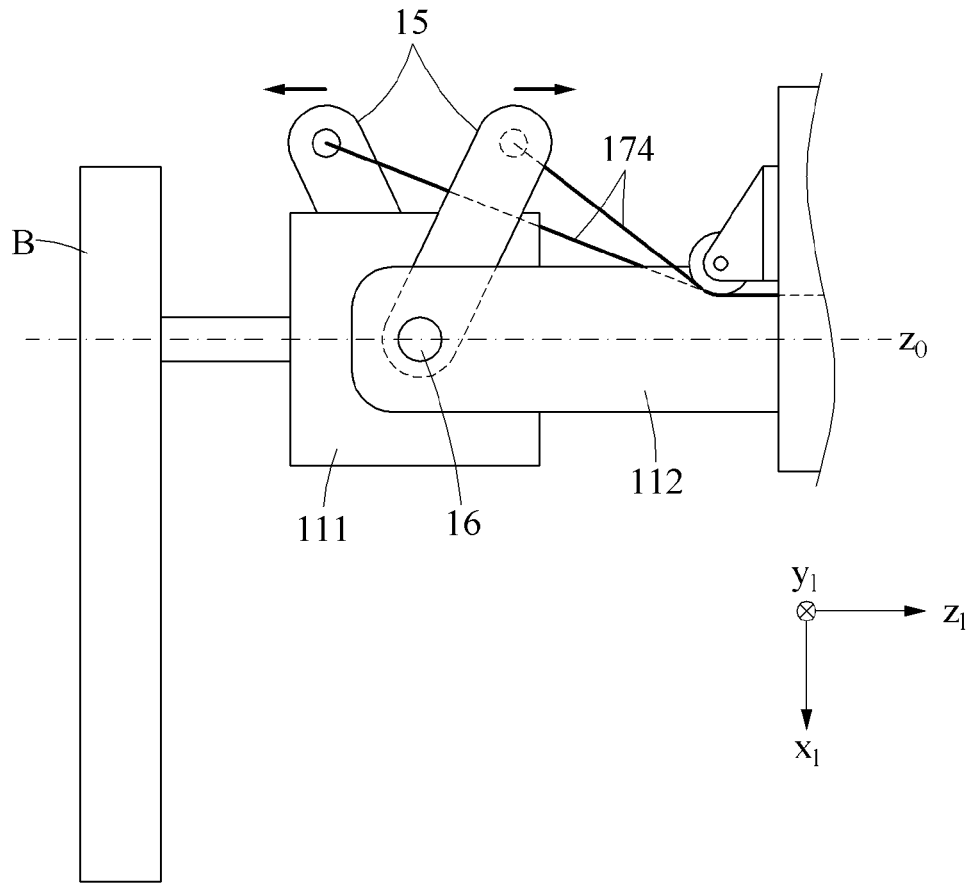
[Fig. 8]
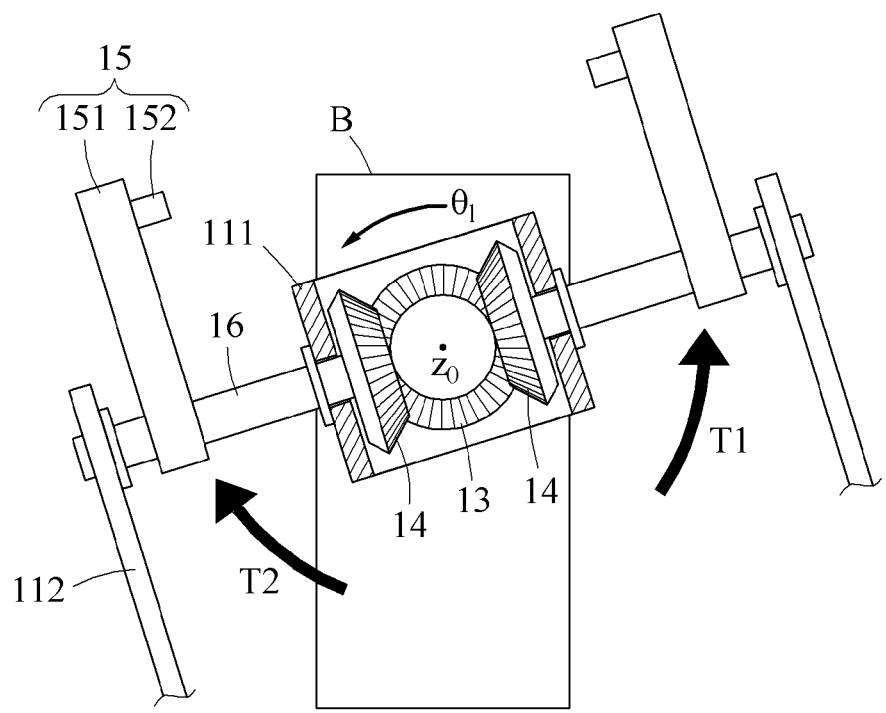

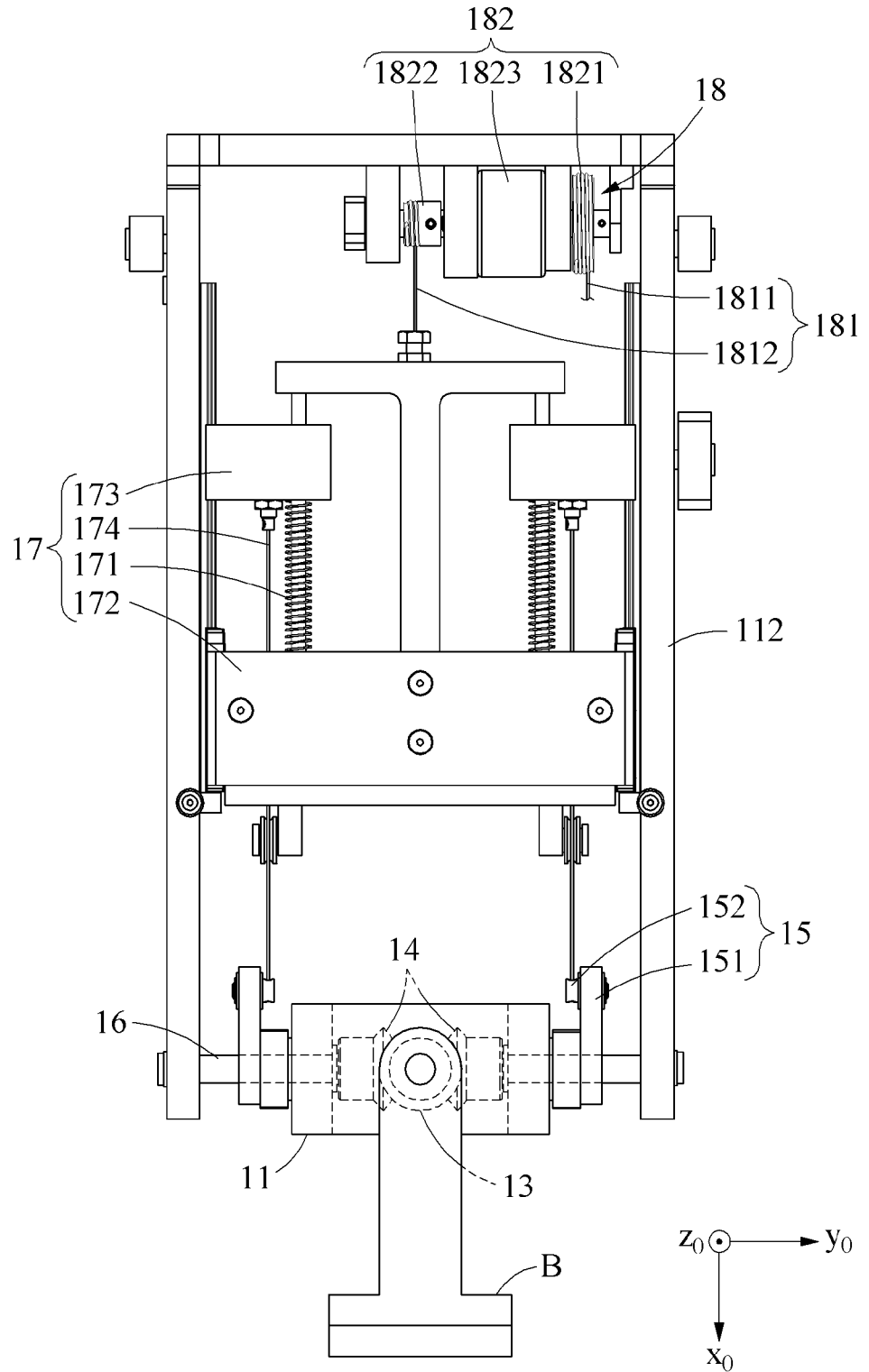
[Fig. 9]

[Fig. 10]
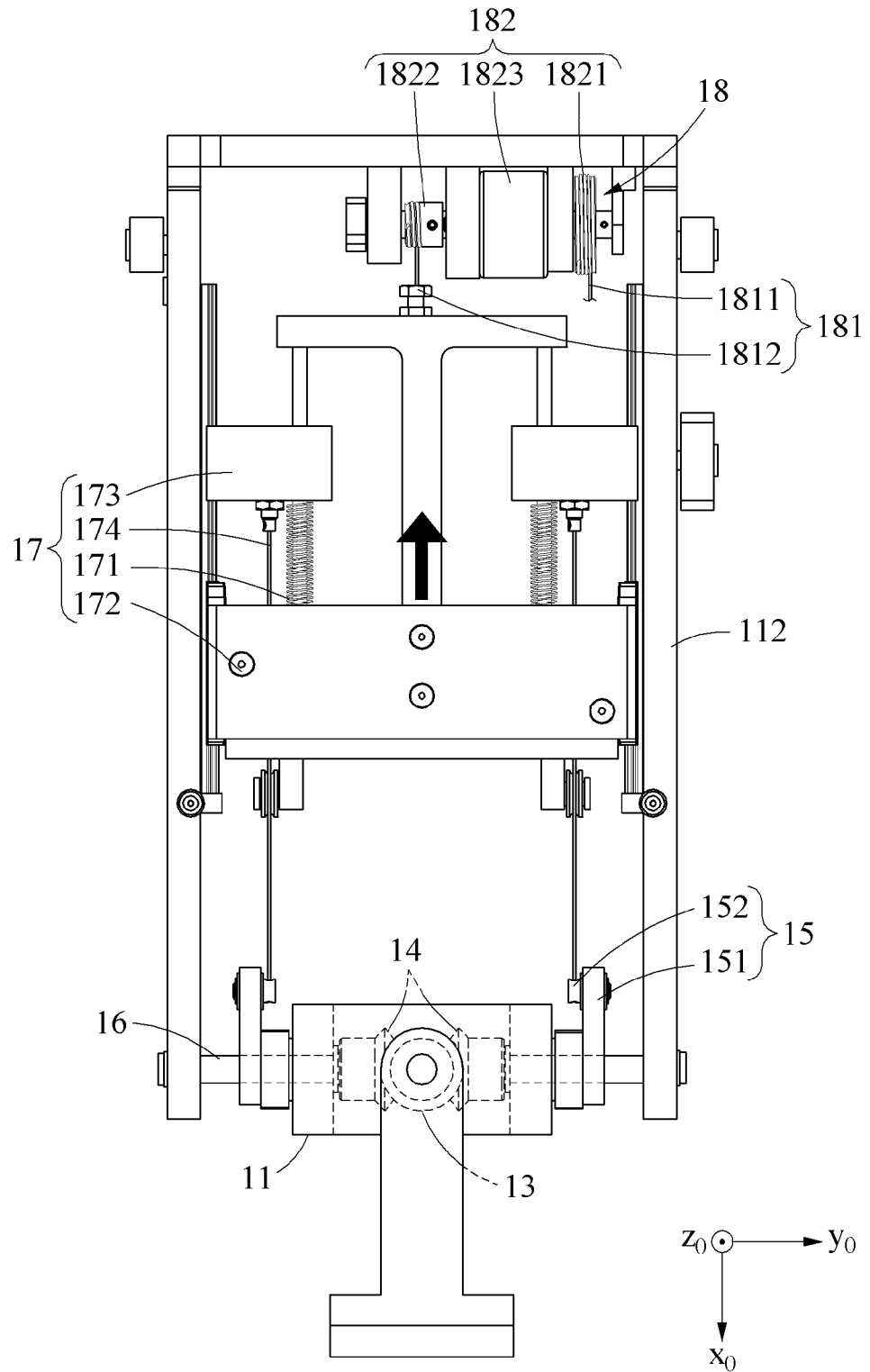

[Fig. 11]
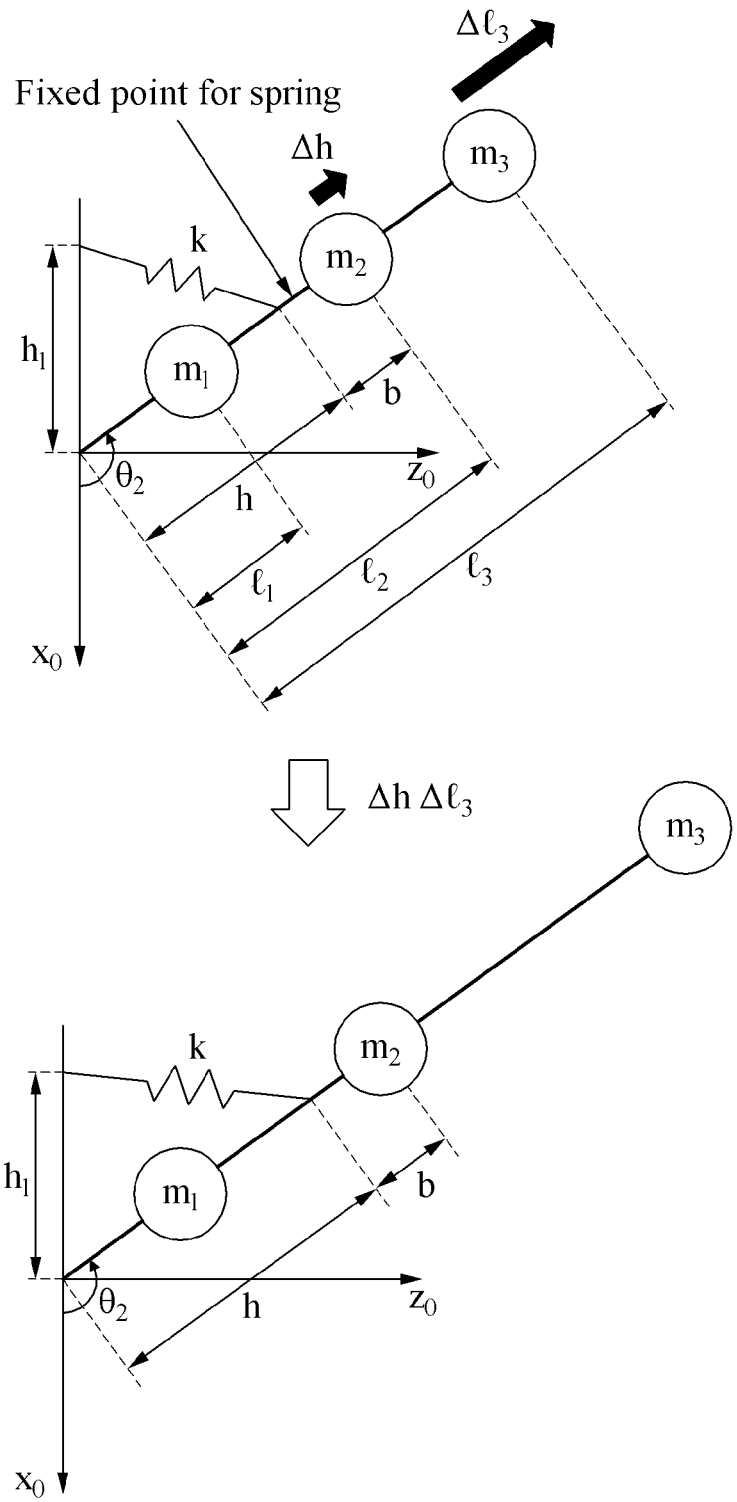

[Fig. 12a]
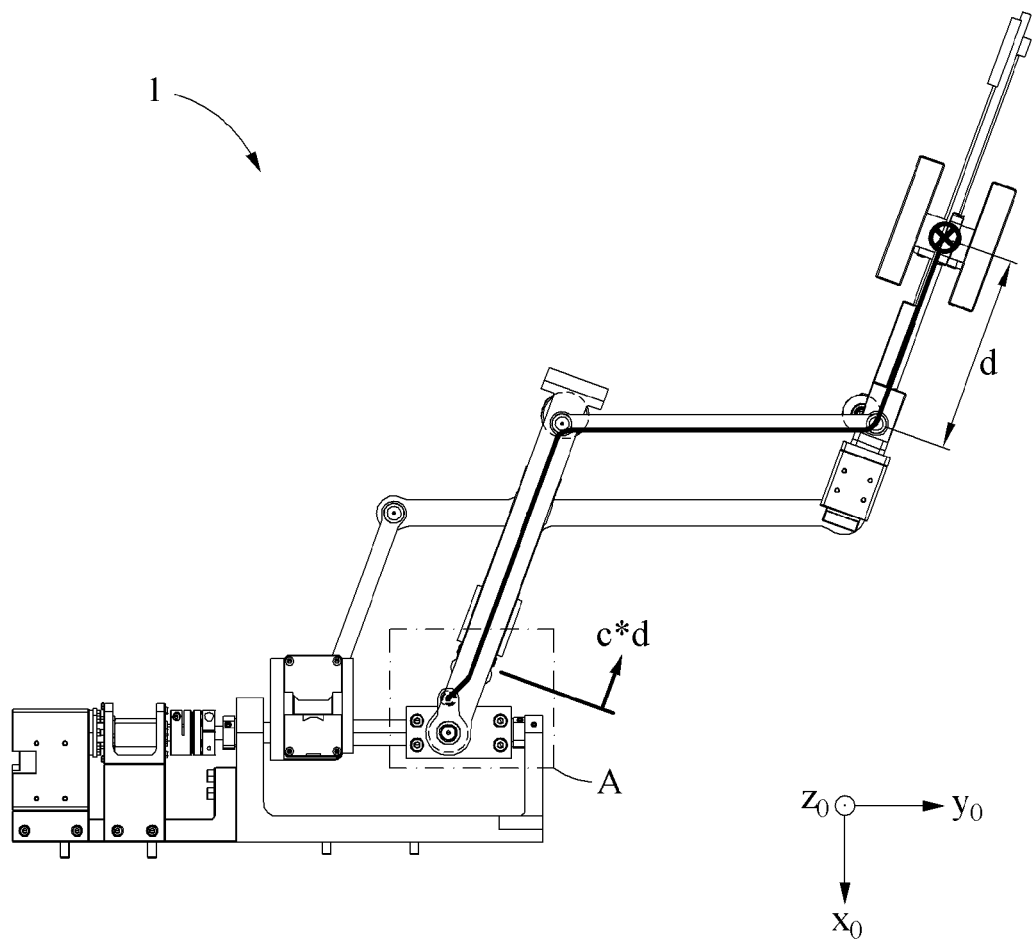
[Fig. 12b]
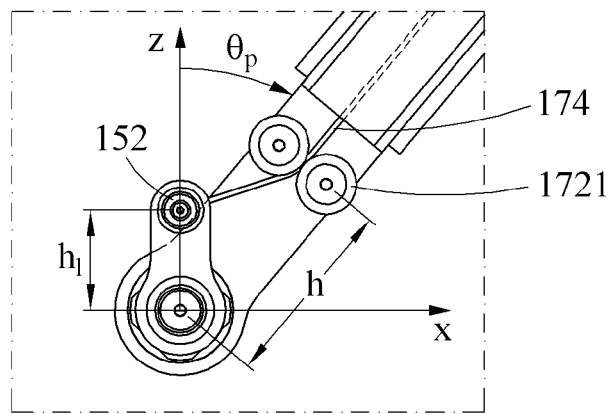

[Fig. 13]
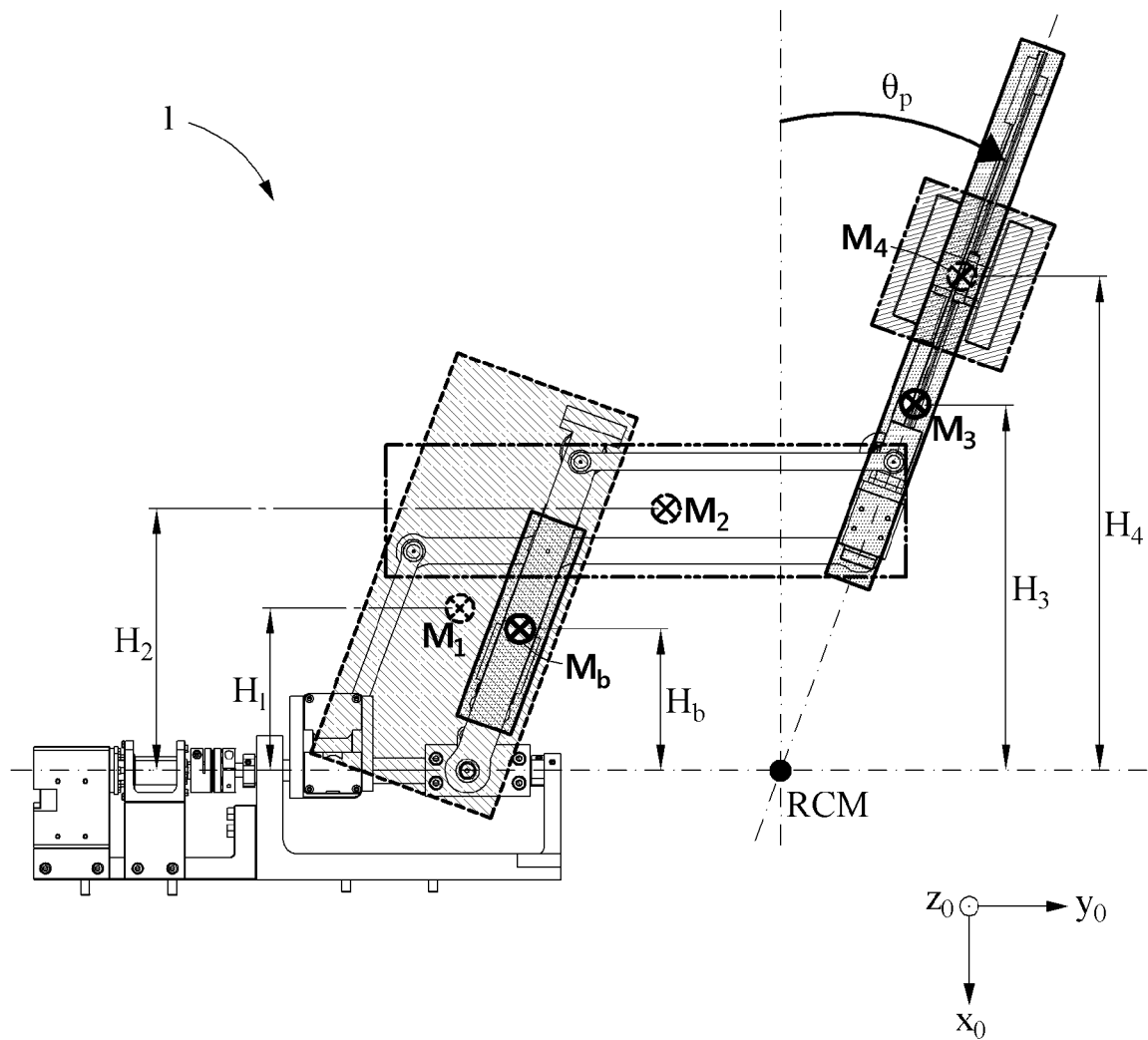

POSITIONING ARM

TECHNICAL FIELD

One or more example embodiments relates to a positioning arm.

BACKGROUND ART

Robots have been used in various fields such as medical field and industrial field. For example, in the medical field, a support device including a positioning arm that can position a surgical instrument and a robot arm free and stable is used as part of a surgical robot system.

Positioning arms with rotational degrees of freedom are commonly used and, for example, are widely used in surgical robots such as a laparoscopic surgery robot and a Da Vinci system. A self-weight of the positioning arm or a weight of an instrument loaded in the positioning arm may act on a joint of the positioning arm to generate a gravitational torque. Since the gravitational torque may change a pose of the positioning arm, it is necessary to constantly apply a force in order to keep the pose of the positioning arm. For example, a user may provide a force to hold the positioning arm, use an actuator such as a motor to provide a constant torque, or fix using a brake.

However, due to the weight of the positioning arm, it is difficult for the user to perform the surgical operation while continuously providing such force, and there is a limit to the weight that can support the positioning arm. In addition, even if an actuator such as a motor is used, an excessive load may be applied. To solve this, the cost increases, the volume increases, and the efficiency decreases in terms of volume. In a case of a locking method using a brake, a process of fastening and unfastening the brake is required, which may reduce a usability. Also, when the brake is released to adjust a position of the positioning arm, the weight of the positioning arm still has to be endured by a person. Accordingly, a gravity compensation means for compensating the self-weight of the positioning arm has been required.

The background art described above has been possessed or acquired by the inventor(s) in the course of conceiving the present invention and is not necessarily an art publicly known before filing the present application.

DISCLOSURE OF INVENTION

Technical Problem

An aspect provides a positioning arm to which a gravity compensation mechanism for three-degrees-of-freedom (3 DOF) motion is applied.

Solution to Problem

According to an aspect, there is provided a positioning arm including a link assembly including a translation link configured to translationally move along a virtual axis passing a remote center of motion (RCM) present at a predetermined position separated from one point and configured to move in at least two directions based on the one point, and a gravity torque compensator configured to provide a compensation torque in a direction opposite to a gravity torque applied to the one point by a self-weight of the link assembly.

The link assembly may be configured to perform a roll-rotation and a pitch-rotation and, irrespective of a roll-rotation angle and a pitch-rotation angle, translationally move along the virtual axis along which the translation link passes the RCM.

The link assembly may further include a gear case configured to perform a roll-rotation with respect to a base, a pitch link configured to perform a pitch-rotation with respect to the gear case, a parallel link configured to move at a pose parallel to a longitudinal direction of the pitch link, and a connection link configured to connect the pitch link and the parallel link. The translation link may be installed to translationally move along a guide provided in the parallel link.

The positioning arm may further include a center bevel gear fixed to the base, a pair of rotary bevel gears engaged to both sides of the center bevel gear to be rotatable with respect to the gear case, and a pair of rotating bodies fixed to the pair of rotary bevel gears to rotate together with the pair of rotary bevel gears with respect to the gear case.

A connecting shaft portion may be provided between the pair of rotary bevel gears and the pair of rotating bodies corresponding thereto. The link assembly may be installed in the connecting shaft portion to be rotatable in one direction.

The pair of rotary bevel gears may be configured to rotate in an opposite direction about a same axis when the link assembly performs the roll-rotation instead of relatively moving when the link assembly performs the pitch-rotation.

The gravity torque compensator may include a pair of elastic bodies having a length changing in response to the roll-rotation or the pitch-rotation of the link assembly to provide an elastic force for generating the compensation torque.

The gravity torque compensator may further include a support located at one side of the pair of elastic bodies, a pair of sliders located at another side of the pair of elastic bodies to be slidable with respect to the pitch link, and a pair of compensation steel wires having one sides fixed to the pair of rotating bodies and the other sides fixed to the pair of sliders.

The positioning arm may further include a gravity torque adjuster configured to reduce a difference between the compensation torque and the gravity torque generated based on a translation distance of the translation link.

The support may include a support portion disposed beside a path on which the pair of compensation steel wires pass, to function as a portion receiving the compensation torque from the pair of compensation steel wires. The gravity torque adjuster may be configured to reduce a length of a moment arm of the compensation torque by lowering the support when the translation link translationally moves toward the RCM, and increase the length of the moment arm of the compensation torque by elevating the support when the translation link translationally moves in a direction in which a distance between the translation link and the RCM increases.

The support may be installed to be slidable with respect to the pitch link. The gravity torque adjuster may include an adjusting steel wire configured to mutually connect the translation link and the support to slidingly move the support when the translation link translationally moves.

The gravity torque adjuster may further include a transmission configured to increase and reduce a sliding distance of the support moving relative to the pitch link in proportion to the translation distance of the translation link moving relative to the parallel link.

The adjusting steel wire may include a first adjusting steel wire and a second adjusting steel wire connected to one side and another side of the transmission. The transmission may include a first reel around which the first adjusting steel wire is wound, a second reel around which the second adjusting steel wire is wound, and a reducer configured to allow the second reel to rotate with respect to the first reel at a set rotation ratio.

The positioning arm may further include a gravity torque adjuster configured to reduce a difference between the compensation torque and the gravity torque generated based on a translation distance of the translation link.

According to another aspect, there is also provided a positioning arm including a link assembly configured to perform a roll-rotation and a pitch-rotation and including a translation link configured to translationally move along a virtual axis passing an RCM present at a predetermined position separated from one point, a plurality of bevel gears configured to engagingly rotate when the link assembly performs the roll-rotation instead of relatively moving when the link assembly performs the pitch-rotation, a rotating body connected to at least one of the plurality of bevel gears to rotate together with a corresponding bevel gear, and a gravity torque compensator connected to the rotating body and configured to provide a compensation torque in an opposite direction with respect to a gravity torque applied by self-weight of the link assembly, by deforming an elastic body in response to the roll-rotation and the pitch-rotation of the link assembly.

The positioning arm may further include a gravity torque adjuster configured to reduce a difference between the compensation torque and the gravity torque by increasing or reducing a length of a moment arm of the compensation torque in response to the translation link moving translationally.

Advantageous Effects of Invention

According to example embodiment, it is possible to manipulate a positioning arm by a small amount of power using a gravity compensation mechanism. In other words, since an input torque to be applied to a driving source is reduced through the gravity compensation mechanism, it is possible to operate using a relatively small and light actuator. Also, energy consumption required only for gravity compensation is reduced, which may improve an energy efficiency.

In addition, even in an emergency in which a power supply is shut down during use of the positioning arm, the positioning arm is not loosened by gravity so that, a stability in a surgical robot field and the like may be increased.

According to example embodiment, a positioning arm may include a gravity compensation mechanism for a center of gravity changing in response to a three-degree-of-freedom (3 DOF) movement, that is, a roll rotation, a pitch rotation, and a translation movement, so as to be stably maintained at various poses in a hemispherical work space irrespective of the gravity. Therefore, it is possible to be widely applied to a surgical robot for minimally invasive surgery that exhibits fulcrum movement.

BRIEF DESCRIPTION OF DRAWINGS

FIG. 5 is a diagram illustrating a pitch-rotation of a positioning arm according to an example embodiment.

FIGS. 6 through 8 are diagrams illustrating a roll-rotation of a positioning arm according to an example embodiment.

FIGS. 9 and 10 are diagrams illustrating an operation of a gravity torque adjuster when a translation link performs translation movement according to an example embodiment.

FIG. 11 is a schematic diagram illustrating a positioning arm according to an example embodiment.

FIG. 12*a* is a diagram illustrating a gravity torque adjuster according to an example embodiment.

FIG. 12*b* is an enlarged view illustrating a portion A of FIG. 12*a*.

FIG. 13 is a diagram illustrating a gravity torque adjuster according to an example embodiment.

MODE FOR THE INVENTION

Figure 1:
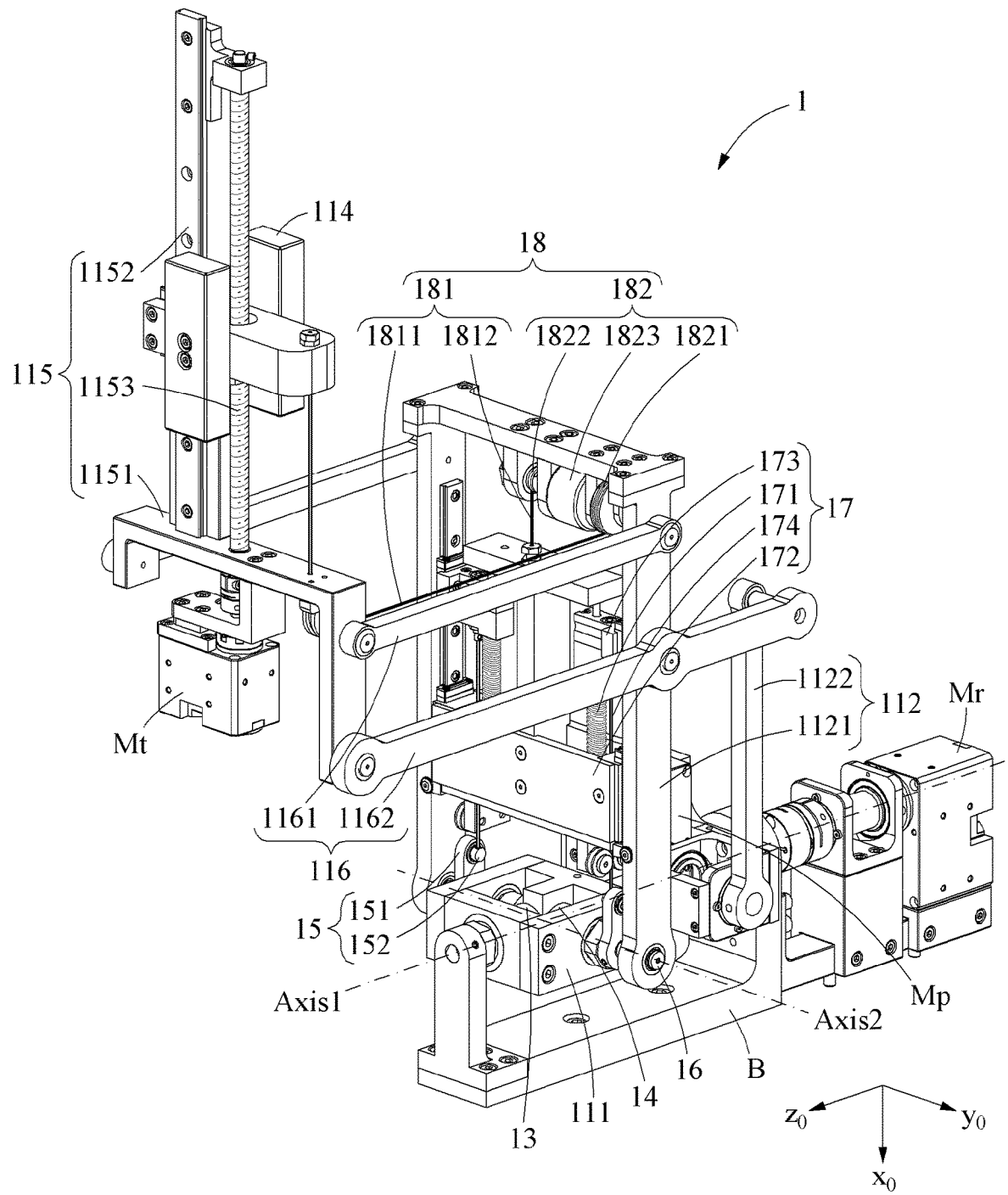
FIG. 1 is a perspective view illustrating a positioning arm according to an example embodiment.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

In addition, terms such as first, second, A, B, (a), (b), and the like may be used herein to describe components. Each of these terminologies is not used to define an essence, order or sequence of a corresponding component but used merely to distinguish the corresponding component from other component(s). It should be noted that if it is described in the specification that one component is "connected", "coupled", or "joined" to another component, a third component may be "connected", "coupled", and "joined" between the first and second components, although the first component may be directly connected, coupled or joined to the second component.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Figure 2:
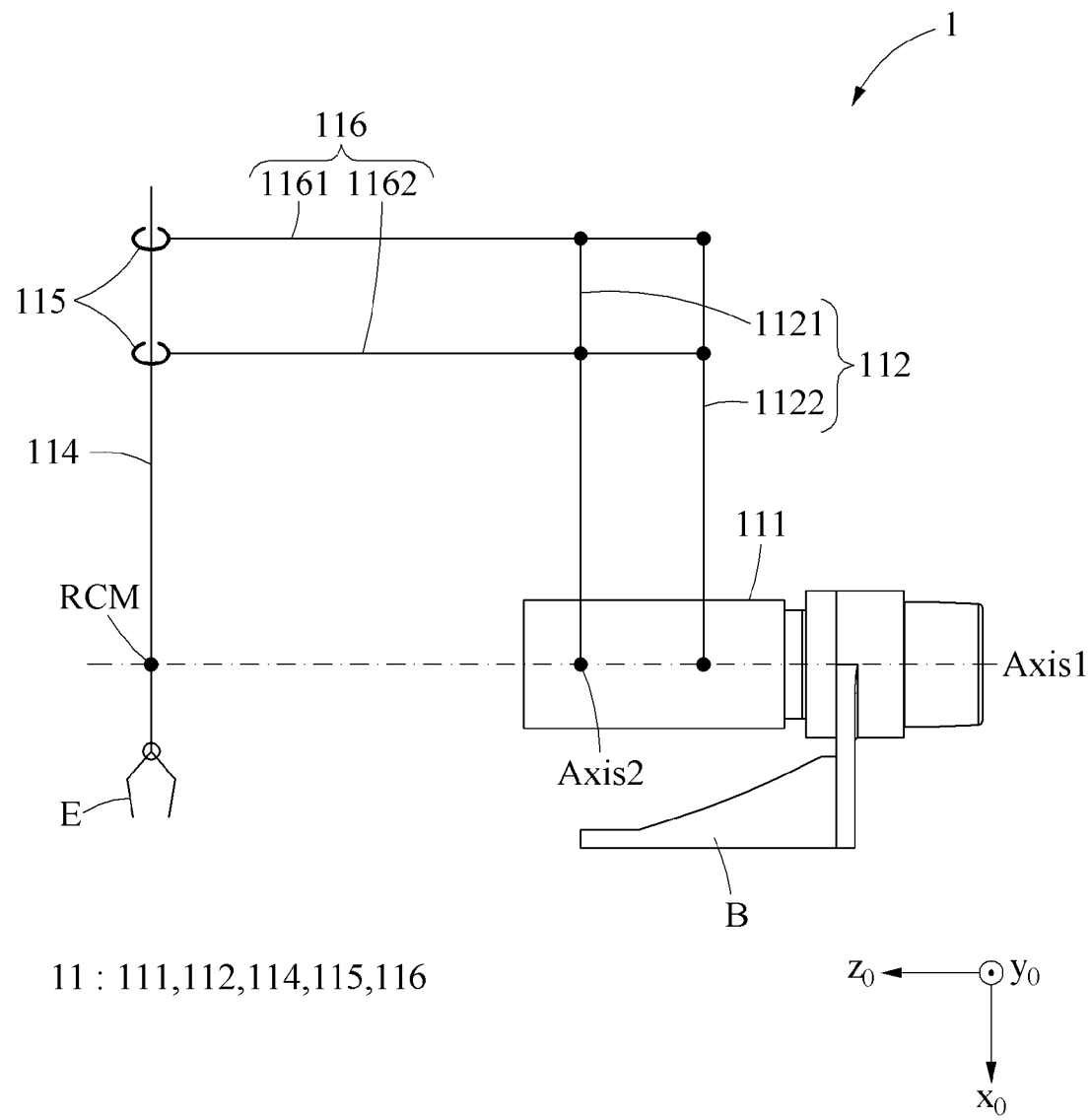
FIG. 2 is a side view illustrating a positioning arm according to an example embodiment.
Figure 3:
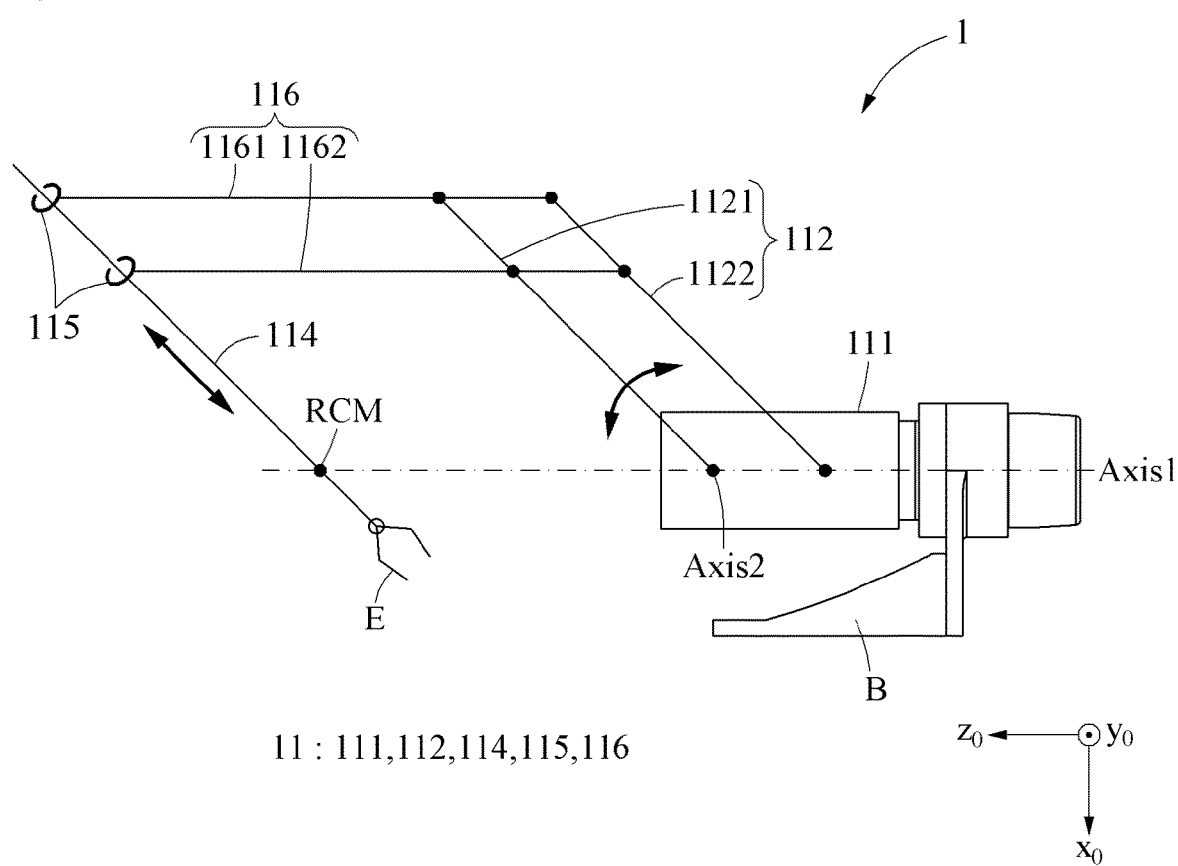
FIG. 3 is a diagram illustrating a pitch-rotation of a positioning arm and a translational movement of a translation link according to an example embodiment.
Figure 4:
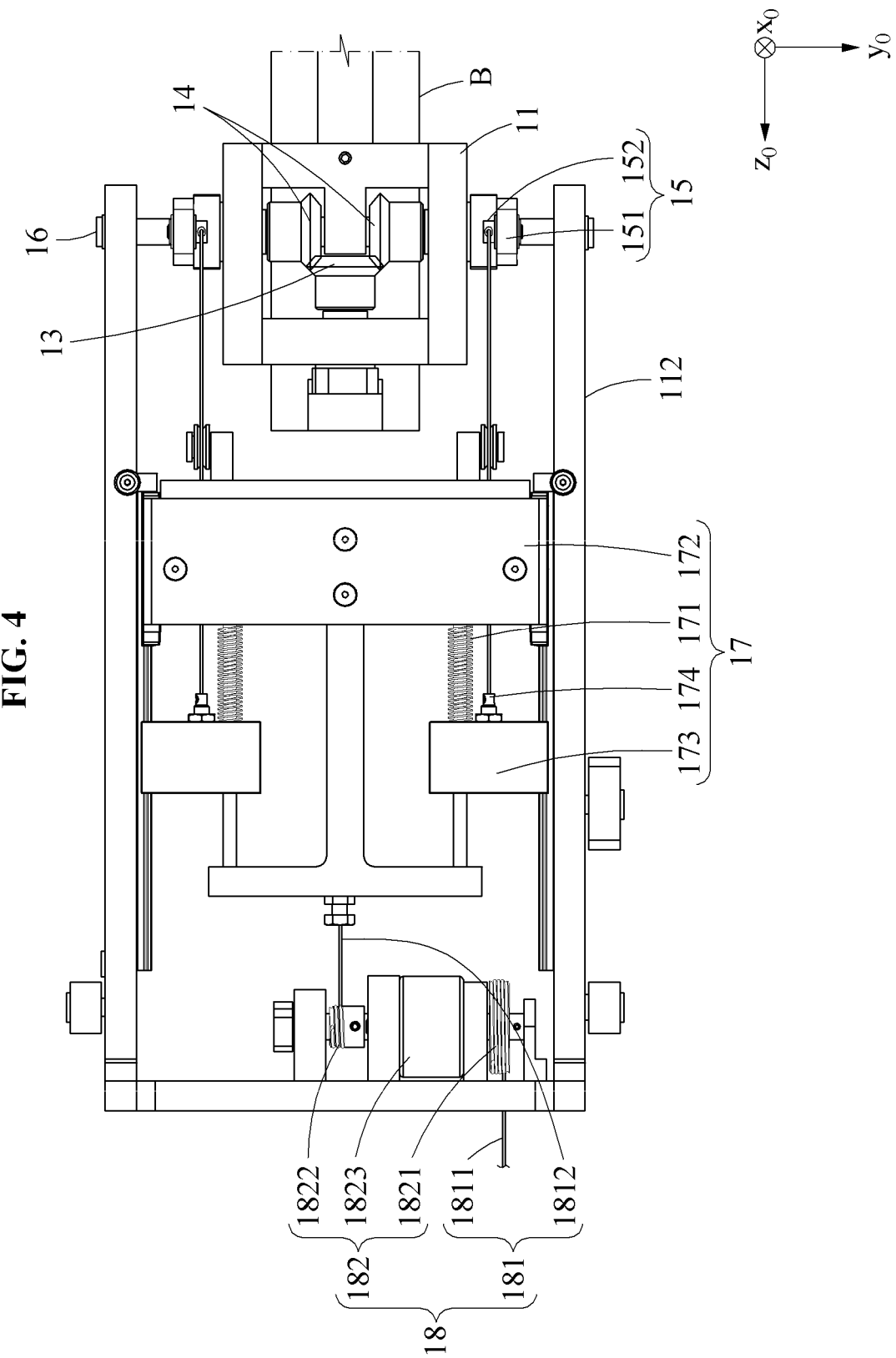
FIG. 4 is a plan view illustrating a portion of a positioning arm pitch-rotated 90 degrees (°) forwardly according to an example embodiment.

FIG. 1 is a perspective view illustrating a positioning arm according to an example embodiment. FIG. 2 is a side view illustrating a positioning arm according to an example embodiment. FIG. 3 is a diagram illustrating a pitch-rotation of a positioning arm and a translational movement of a translation link according to an example embodiment. FIG. 4 is a plan view illustrating a portion of a positioning arm pitch-rotated 90 degrees (°) forwardly according to an example embodiment.

Referring to FIGS. 1 through 4, an end portion 114 of a positioning arm 1 may perform at least three-degrees-of-freedom (3 DOF) rotation, for example, roll-rotation, pitch-rotation, and translation movement with respect to a base B. In FIGS. 1 through 4, a coordinate system (x0, y0, z0) may be a global coordinate system having "one point" at which a roll-rotation axis Axis 1 and a pitch-rotation axis Axis 2 intersect with each other as an origin and an x0 axis may be set in a direction of gravity.

The positioning arm 1 may include a device for providing a compensation torque in a direction opposite to the gravity torque acting on the one point, thereby reducing power required to maintain a pose of the positioning arm 1. The positioning arm 1 may include a link assembly 11, a center bevel gear 13, a rotary bevel gear 14, a rotating body 15, a connection axis portion 16, a gravity torque compensator 17, and a gravity torque adjuster 18.

The link assembly 11 may include a translation link 114 that translationally moves along a virtual axis passing a remote center of motion (RCM) present at a predetermined position separated from the one point, and may move in at least two directions based on the one point. For example, the link assembly 11 may perform a roll-rotation and a pitch-rotation and, irrespective of a roll-rotation angle and a pitch-rotation angle, translationally move along the virtual axis along which the translation link 114 passes the RCM. The link assembly 11 may include a gear case 111, a pitch link 112, the translation link 114, a parallel link 115, and a connection link 116.

The gear case 111 may perform the roll-rotation with respect to the base B. For example, the gear case 111 may be rotatably connected to a connection axis portion (not shown) connecting the center bevel gear 13 and the base B. The gear case 111 may include a structure in which rotation axes of a plurality of bevel gears 13, 14 penetrate, and support the rotary bevel gear 14 to be engaged with the center bevel gear 13.

The pitch link 112 may perform the pitch-rotation with respect to the gear case 111. For example, the pitch link 112 may be rotatably connected to the connection axis portion 16 connecting the rotary bevel gear 14 and the rotating body 15. The pitch link 112 may include a first pitch link 1121 and a second pitch link 1122 installed to be parallel with each other.

The translation link 114 may perform the roll-rotation and the pitch-rotation with respect to the base B and perform the translation movement along the virtual axis passing the RCM. For example, the translation link 114 may be installed to perform the translation movement along a guide 1152 included in the translation link 114. Although FIG. 1 illustrates the translation link 114 with simplified structure, the translation link 114 may be equipped with various devices required to implement the RCM such as a surgical tool E as illustrated in FIGS. 2 and 3.

The translation link 114 may move at a pose parallel to a longitudinal direction of the pitch link 112. The translation link 114 may include a cross bar 1151 connected to the connection link 116 and the guide 1152 installed in a direction vertical to the cross bar 1151 to guide the translation link 114.

The connection link 116 may connect the pitch link 112 and the translation link 114. The connection link 116 may be installed in parallel to vertical line connecting a rotation axis of the first pitch link 1121 and a rotation axis of the second pitch link 1122. The connection link 116 may include a first connection link 1161 and a second connection link 1162 installed in parallel with each other. The pitch link 112 may be installed in parallel with a vertical line connecting the rotation axis of the first connection link 1161 and the rotation axis of the second connection link 1162.

According to the above-described structure of the link assembly 11, the pitch link 112, the translation link 114 and the connection link 116 may perform a movement similar to a 4-bar linkage in a parallelogram shape. Thus, as illustrated in FIGS. 2 and 3, irrespective of the pitch-rotation angle of the positioning arm 1, the translation link 114 may perform the translation movement along the vertical axis passing the RCM. Also, when the roll-rotation axis Axis 1 and the pitch-rotation axis Axis 2 intersect at the same point, the translation link 114 may perform the translation movement along the vertical axis passing the same RCM irrespective of the roll-rotation angle of the positioning arm 1.

The center bevel gear 13 may be fixed to the base B not to rotate with respect to the base B.

A pair of rotary bevel gears 14 may be engaged to both sides of the center bevel gear 13 and installed to be rotatable with respect to the gear case 11.

In the above-described structure, the plurality of bevel gears 13, 14 may not relatively rotate when the link assembly 11 performs the pitch-rotation (refer to FIG. 5) and may engagingly rotate when the link assembly 11 performs the roll-rotation (refer to FIGS. 6 through 8). The plurality of bevel gears 13, 14 may have a gear ratio of, for example, 1:1.

The rotating body 15 may be connected to at least one of the plurality of bevel gears 13, 14 to rotate together with the bevel gears 13, 14. For example, a pair of rotating bodies 15 may be fixed to the pair of rotary bevel gears 14 to rotate together with the pair of rotary bevel gears 14 with respect to the gear case 11. The rotating body 15 may include a cam 151 fixed to the connection axis portion 16 to rotate at the same angle as the rotary bevel gear 14 corresponding thereto, and a connector 152 spaces apart from the connection axis portion 16 and rotatably installed to the cam 151. A compensation steel wire 174, which will be described later, may be connected to the connector 152.

The connection axis portion 16 may be formed between the pair of rotary bevel gears 14 and the pair of rotating bodies 15 corresponding thereto, and the link assembly 11 may be installed to rotate about the connection axis portion 16 in one direction.

The gravity torque compensator 17 may provide a compensation torque in an opposite direction to the gravity torque acting on the one point by a self-weight of the link assembly 11. For example, the gravity torque compensator 17 may provide a compensation torque by changing a length of an elastic body 171 in response to the roll-rotation and/or the pitch-rotation of the link assembly 11. The gravity torque compensator 17 may include a pair of elastic bodies 171, a support 172, a pair of sliders 173, and a pair of compensation steel wires 174.

The pair of elastic bodies 171 may be, for example, a compression spring as illustrated in the drawing, but not be limited thereto. Thus, it will be understood by a person skilled in the art that various elastic means can be used in addition to the compression spring.

The support 172 may be located at one side of the pair of elastic bodies 171 to support an end portion of the pair of elastic bodies 171. The support 172 may include a support portion 1721 (refer to FIGS. 12a and 12b) disposed beside a path on which the pair of compensation steel wires 174 pass. The support portion 1721 may function as a portion in contact with the compensation steel wire 174 to receive the compensation torque from the compensation steel wire 174. The support portion 1721 may be embodied as, for example, a roller not to interfere with a movement of the compensation steel wire 174. The support 172 may be installed to be slidable with respect to the pitch link 112, thereby mutually interacting with the gravity torque adjuster 18. Related description will be made later.

The pair of sliders 173 may be located at another side of the pair of elastic bodies 171. For example, the support 172 and the slider 173 may be located at opposite sides based on the elastic body 171. The pair of sliders 173 may be installed to be slidable with respect to the pitch link 112, so that an amount of deformation of the elastic body 171 is determined based on a change in space between the support 172 and the slider 173 and a tensile force applied to the compensation steel wire 174 is changed.

One sides of the pair of compensation steel wires 174 may be fixed to the pair of rotating bodies 15 and other sides thereof may be fixed to the pair of sliders 173. According to the compensation steel wire 174, a position of the pair of sliders 173 may be adjusted in conjunction with a rotation angle of the rotating body 15. Also, the compensation steel wire 174 may be installed to penetrate the support 172, so that a partial force of the tensile force applied to the compensation steel wire 174 provides a torque for rotating the support 172 in a pitch direction. As such, based on spaces between the pair of sliders 173 and the support 172, the compensation torque provided by the compensation steel wire 174 to the support 172 and the pitch link 112 connected thereto may be changed.

The gravity torque adjuster 18 may reduce a difference between the compensation torque and the gravity torque generated based on a translation distance of the translation link 114. The gravity torque adjuster 18 may reduce an elastic position energy of the elastic body 171 when the translation link 114 translationally moves toward the RCM (for example, when a rotation moment of the link assembly 11 is reduced), and may increase elastic position energy of the elastic body 171 when the translation link 114 translationally moves in a direction in which a distance between the translation link 114 and the RCM increases (for example, when the rotation moment of the link assembly 11 increases). The gravity torque adjuster 18 may include an adjusting steel wire 181 and a transmission 182.

The adjusting steel wire 181 may mutually connect the translation link 114 and the support 172, so that the support 172 slidingly moves when the translation link 114 translationally moves. The adjusting steel wire 181 may include a first adjusting steel wire 1811 connecting the translation link 114 and the transmission 182 and a second adjusting steel wire 1812 connecting the transmission 182 and the support 172.

The transmission 182 may be installed to the adjusting steel wire 181 to increase and reduce a sliding distance of the support 172 moving relative to the pitch link 112 in proportion to the translation distance of the translation link 114 moving relative to the translation link 114. The transmission 182 may include a first reel 1821 around which the first adjusting steel wire 1811 is wound, a second reel 1822 around which the second adjusting steel wire 1812 is wound, and a reducer 1823 configured to allow the second reel 1822 to rotate with respect to the first reel 1821 at a set rotation ratio.

Here, the set rotation ratio may be set based on a given design specification such as a modulus of elasticity of the elastic body 171 such that a difference between the gravity torque and the compensation torque is minimized as described with reference to FIGS. 12a through 13.

The positioning arm 1 may be used as a slave manipulator of a master-slave surgical system. The positioning arm 1 may further include a roll-rotation motor M_r to roll-rotate the link assembly 11, a pitch-rotation motor M_p to pitch-rotate the link assembly 11, and a translational movement motor M_t to translationally move the translation link 114.

The roll-rotation motor M_r may be connected to the base B to roll-rotate the gear case 111. The pitch-rotation motor M_p may pitch-rotate the pitch link 112 with respect to the gear case 111 while rotating together with the gear case 111. The translational movement motor M_t may be installed to the translation link 114 to translationally move the translation link 114 with respect to the translation link 114. The parallel link 115 may include a screw shaft 1153 that moves the translation link 114 in a manner of a ball screw.

FIG. 5 is a diagram illustrating a pitch-rotation of a positioning arm according to an example embodiment. In FIG. 5, the gear case 111 is omitted for ease of understanding.

A coordinate system in the drawings of the present disclosure will be described with reference to a coordinate system of FIG. 5. A coordinate system (x0, y0, z0) may be a global coordinate system fixed to the base B. The coordinate system (x1, y1, z1) may be a coordinate system rotated at the roll-rotation angle θ1 based on an axis z0. A coordinate system (x2, y2, z2) may be a coordinate system rotated at the pitch-rotation angle θ2 based on an axis y1. Positions of origins of the three coordinate systems may be centers of a roll-rotation and a pitch-rotation of the link assembly 11 and thus, are the same. In this example, the coordinate system (x2, y2, z2) may be understood as a local coordinate system fixed to the pitch link 112.

Referring to FIGS. 1 through 5, when the pitch link 112 performs the pitch-rotation at the angle θ2 on the coordinate system (x1, y1, z1), that is, when the pitch link 112 performs the pitch-rotation with respect to the gear case 111 based on the connection axis portion 16 of the pair of rotary bevel gears 14, the pair of rotary bevel gears 14 may be engaged with the locked center bevel gear 13 and thus, may not move relatively.

When the link assembly 11 performs the pitch-rotation, a distance between the connector 152 and the support 172 may increase as an angle between the rotating body 15 and the pitch link 112 increases. Through this, the slider 173 may be pulled toward the support 172 by a tensile force of the compensation steel wire 174, so that the elastic body 171 is compressed. In this example, as an elastic force of the elastic body 171 increases, the tensile force applied to the compensation steel wire 174 may correspondingly increase. As described above, the tensile force applied to the compensation steel wire 174 may provide a compensation torque in an opposite direction to the gravity torque by a self-weight of the link assembly 11. The aforementioned gravity compensation process based on a pose changing in response to the pitch-rotation is based on "Static balancing of a manipulator with hemispherical work space", Advanced Intelligent Mechatronics (AIM), 2010 IEEE/ASME International Conference on.

FIGS. 6 through 8 are diagrams illustrating a roll-rotation of a positioning arm according to an example embodiment. FIG. 6 illustrates directions in which the pair of rotary bevel gears 14 and the rotating body 15 rotate when the link assembly 11 performs a roll-rotation based on an axis z1. FIGS. 7 and 8 illustrate the link assembly 11 changed when a roll-rotation has been performed by an angle θ1.

Referring to FIGS. 6 through 8, when the gear case 111 performs the roll-rotation with respect to the base B based on a connection axis portion of the center bevel gear 13, the pair of rotary bevel gears 14 may revolve at the roll-rotation angle θ1 the same as the gear case 111 based on an axis z_0 which is a central axis of the fixed center bevel gear 13. As a result, the pair of rotary bevel gears 14 may respectively rotate at angles θ1$_m$ and θ2$_m$ in opposite directions based on an axis y_1 which is a central axis of the pair of rotary bevel gears 14.

For example, the rotating body 15 that is located on a left side in FIG. 8 may rotate in a rightward direction with reference to FIG. 7. In this example, an elastic potential energy of the elastic body 171 corresponding thereto may be changed, which may change a compensation torque T2 applied in a clockwise direction based on an axis z0.

Likewise, the rotating body 15 that is located on a right side in FIG. 8 may rotate in a leftward direction with reference to FIG. 7. In this example, an elastic potential energy of the elastic body 171 corresponding thereto may be changed, which may change a compensation torque T1 applied in a counterclockwise direction based on the axis z0.

As a result, a sum torque of the compensation torques T1 and T2 may compensate for the gravity torque. The aforementioned gravity compensation process based on a pose changing in response to the roll-rotation is based on "Static balancing of a manipulator with hemispherical work space", Advanced Intelligent Mechatronics (AIM), 2010 IEEE/ASME International Conference on.

A principal of providing a compensation torque in response to a change in the roll-rotation angle θ1 and the pitch-rotation angle θ2 of the link assembly 11 are described with reference to FIGS. 5 through 8. However, even if the roll-rotation angle θ1 and the pitch-rotation angle θ2 of the link assembly 11 are not changed as illustrated herein, a length of a moment arm from an origin to a center of gravity of the link assembly 11 may change when a component (114: the translation link) included in the link assembly 11 moves relative to another component. Thus, the gravity torque changing in response thereto may not be compensated for only based on the research papers in related arts. Hereinafter, the gravity torque adjuster 18 that may reduce a difference between the gravity torque and the compensation torque even in such situation will be described.

FIGS. 9 and 10 are diagrams illustrating an operation of a gravity torque adjuster when a translation link performs translation movement according to an example embodiment. FIG. 9 is a front view of some components of the positioning arm in the state of FIG. 1, and FIG. 10 illustrates a translation link away from the RCM in the state of FIG. 9.

Referring to FIGS. 9 and 10, the positioning arm 1 may have a structure in which the support 172 connected to the adjusting steel wire 181 slidingly moves to be away from the origin as a distance between the translation link 114 and the RCM increases and a rotational moment of the link assembly 11 with respect to the origin increases. Accordingly, a distance between the slider 173 and the support 172 may be reduced, so that an amount of deformation of the elastic body 171 increases. Also, as the support 172 is elevated, a distance h from one point (a point at which a roll-rotation axis and a pitch-rotation axis intersect with each other) to the support portion 1721 (refer to FIGS. 12*a* and 12*b*) may increase. As such, when the distance h increases, a length of a moment arm of a compensation torque provided by the compensation steel wire 174 to the link assembly 11 may increase. As a result, as the distance between the translation link 114 the RCM increases, the compensation torque may increase, so that the gravity torque adjuster 18 reduces a difference between the gravity torque and the compensation torque changed in response to a translational movement of the translation link 114.

As described above, a compensation torque changing in response to a change in three movements, that is, a roll-rotation, a pitch-rotation, and a translation movement may be provided. Hereinafter, an effectiveness of a compensation torque generated in response to the three movements will be described with reference to a schematic diagram. Furthermore, a structure and/or a condition for compensating for a change in gravity torque with increased accuracy will be described.

FIG. 11 is a schematic diagram illustrating a positioning arm according to an example embodiment. In FIG. 11, the gravity torque adjuster 18 is omitted for brevity.

Referring to FIG. 11, the positioning arm 1 may be represented by a model in which three mass bodies m1, m2, and m3 connected to be mutually slidable move based on an origin O. In this instance, (i) a first mass body m1 may correspond to the pitch link 112, (ii) a second mass body m2 may correspond to the translation link 114, the connection link 116, the gravity torque compensator 17, and the gravity torque adjuster 18, and (iii) a third mass body m3 may correspond to the translation link 114. Center-of-gravity distances of the three mass bodies m1, m2, and m3 may be l1, l2, and l3, respectively.

The elastic body 171 may be represented as a zero-length spring, and a modulus of elasticity may be denoted by k. It is known to a person skilled in the art that the zero-length spring can be implemented in a manner consistent with the examples described herein.

h1, h, and b may be defined as follows.

h1: distance from the origin O to one end of the zero-length spring model on an x1-z1 plane coordinate system h: distance from the origin O to the other end of the zero-length spring model on the x1-z1 plane coordinate system b: distance from the other end of the zero-length spring model k to the second mass body m2 on the x1-z1 plane coordinate system Here, h1 is a constant equal to a distance from the connection axis portion 16 to the connector 152. h is a variable obtained by adding an initial value of h1 to a relative translation distance (Δh=Δl2) of the support 172 with respect to the pitch link 112. b is a constant obtained by subtracting the variable h from the center-of-gravity distance l2 of the second mass body m2.

In order to compensate for the gravity torque during the pitch-rotation, irrespective of the pitch-rotation angle θ2, a sum of a total potential energy of the positioning arm 1 may need to be a constant. When a sum of the three mass bodies m1, m2, and m3 is m and a total center-of-gravity distance of the three mass bodies m1, m2, and m3 is l, a sum of a total potential energy of the positioning arm 1 may be expressed by a sum of an elastic potential energy and a gravity potential energy as shown in Equation 1.

[Equation 1]

$$\text{Potential Energy } V(\theta_2, h) = \\ E \text{ spring} + E \text{ gravity} = \frac{1}{2}kx^2 - mgl*\cos(\theta_2) = \\ \frac{1}{2}k(h^2 + h_1^2 - 2hh_1\cos(\pi - \theta_2)) - mgl*\cos\theta_2 = \\ \cos\theta_2(khh_1 - mgl) + \frac{1}{2}k(h^2 + h_1^2)$$

It can be known from a first term of a result of arranging Equation 1 that a condition $$k = \frac{mgl}{hh_1}$$

should be satisfied. Equation 2 may be obtained by applying a center of gravity formula to the condition as shown below.

$$l_3 = -\frac{(m_1 l_1 + m_2 b)}{m_3} + \frac{\left(\frac{kh_1}{g} - m_2\right)}{m_3} h \quad \text{[Equation 2]}$$

It can be known from Equation 2 that a variation $\Delta l3$ of the center-of-gravity distance l3 of the third mass body m3 should be proportional to a variation $\Delta h$ (=$\Delta l2$) of h as defined above ($\Delta l_2 \propto \Delta l_3$). In other words, a structure in which a translation distance of the translation link 114 with respect to the pitch link 112 is increased or reduced in proportional to a translation distance of the support 172 with respect to the pitch link 112 may be employed, and the corresponding condition may be satisfied according to the example embodiment.

FIGS. 12a through 13 are diagrams illustrating a gravity torque adjuster according to an example embodiment.

Referring to FIGS. 12a through 13, a gravity torque according to a roll-rotation angle θ_r and a pitch-rotation angle θ_p may be calculated using the following equations, thereby determining a spring constant k of the elastic body 171 and a reduction gear ratio of a set rotation ratio c of a reduction gear 1823 corresponding thereto.

Terms used in the corresponding equations are as follows, and repeated parts of the above-described terms will be omitted. In FIG. 13 and the following equations, M_1, M_2, M_3, M_4, and M_b respectively correspond to the pitch link 112, the connection link 116, the parallel link 115, the translation link 114, and the support 112. Also, H_i denotes a height from an origin to a center of gravity of M_i.

- $a_i$: distance between the COM of $M_i$ and the center of rotation
- $h_1$: moment arm of bevel gravity compensator (constant)
- h: moment arm of bevel gravity compensator (variable)
- c: 1/(gear ratio of proposed mechanism)
- d: translational moving length (0<d<150 mm)
- x: compressed length of spring
- $\theta_{1m}$: rotation of bevel gear 1
- $\theta_{2m}$: rotation of bevel gear 2
- k: spring constant of gravity compensator
- $\tau_{g,r}$: gravitational torque w.r.t. roll
- $\tau_{g,p}$: gravitational torque w.r.t. pitch
- $\tau_{k,r}$: compensating torque w.r.t. roll
- $\tau_{k,p}$: compensating torque w.r.t. pitch
- $\tau_r$: total torque w.r.t. roll
- $\tau_p$: total torque w.r.t. pitch
- $V_k(q)$: potential energy of 1-DoF gravity compensator w.r.t. q
- $V_{k,total}$: total potential energy of the system An equation for calculating the gravity torque according to the roll-rotation angle θ_r and the pitch-rotation angle θ_p may be as follows.

$$U_i = M_i g a_i$$

$$U = \sum_{i=1}^{4} U_i + U_b$$

$$H_i = a_i \cos(\theta_r)\cos(\theta_p)$$

$$\tau_{g,r} = \frac{\partial U}{\partial \theta_r} = -g\sin(\theta_r)\cos(\theta_p) *$$
$$(M_1 a_1 + M_2 a_2 + M_3 a_3 + M_4(a_{4,init} + d) + M_b(a_{b,init} + c*d))$$

$$\tau_{g,p} = \frac{\partial U}{\partial \theta_p} = -g\cos(\theta_r)\sin(\theta_p) *$$
$$(M_1 a_1 + M_2 a_2 + M_3 a_3 + M_4(a_{4,init} + d) + M_b(a_{b,init} + c*d))$$

$$h = h_{init} + c*d$$

$$\theta_{1m} = -\theta_p - \theta_r - \pi$$

$$\theta_{2m} = -\theta_p + \theta_r - \pi$$

$$x(q) = h_1^2 + h^2 + 2h_1 h * \cos(q)$$

$$V_{k,total} = V_k(\theta_{1m}) + V_k(\theta_{2m})$$

$$\tau_{k,r} = \frac{\partial V_{k,total}}{\partial \theta_r} = 2kh_1(h_{init} + c*d)\sin(\theta_r)\cos(\theta_p)$$

$$\tau_{k,p} = \frac{\partial V_{k,total}}{\partial \theta_p} = 2kh_1(h_{init} + c*d)\sin(\theta_p)\cos(\theta_r)$$

$$\tau_r = \tau_{g,r} + \tau_{k,r} = 0$$

$$\tau_p = \tau_{g,p} + T_{k,p} = 0$$

$$k = \frac{g(M_1 a_1 + M_2 a_2 + M_3 a_3 + M_4(a_{4,init} + d) + M_b(a_{b,init} + c*d))}{(2h_1(h_{init} + c*d))} = const.$$

Through the above-described expansion procedure, a modulus of elasticity of the elastic body 171 and the set rotation ratio of the reduction gear 1823 may be determined as follows.

$$k = \frac{g(M_1 a_1 + M_2 a_2 + M_3 a_3 + M_4(a_{4,init} + d) + M_b(a_{b,init} + c*d))}{2h_1(h_{init} + c*d)} = const.$$

$$c = \frac{M_4 h_{init}}{M_1 a_1 + M_2 a_2 + M_3 a_3 + M_4 a_{4,init} + M_b(a_{b,init} - h_{init})}$$

$$k = \frac{g(M_1 a_1 + M_2 a_2 + M_3 a_3 M_4 a_{4,init} + M_b a_{b,init}}{2h_1 h_{init}}$$

As such, a gravity compensation apparatus may be provided with increased efficiency by changing the modulus of elasticity of the elastic body 171 and the set rotation ratio of the reduction gear 1823 based on remaining design specifications and reducing a difference between the gravity torque and a compensation torque.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. A positioning arm comprising:
   a link assembly comprising a translation link configured to translationally move along a virtual axis passing a remote center of motion (RCM) present at a predetermined position separated from one point, and configured to move in at least two directions based on the one point; and
   a gravity torque compensator configured to provide a compensation torque in a direction opposite to a gravity torque applied to the one point by a self-weight of the link assembly, wherein the link assembly is configured to perform a roll-rotation and a pitch-rotation and, irrespective of a roll-rotation angle and a pitch-rotation angle, translationally move along the virtual axis along which the translation link passes the RCM,
wherein the link assembly further comprises:
   a gear case configured to perform a roll-rotation with respect to a base;
   a pitch link configured to perform a pitch-rotation with respect to the gear case;
   a parallel link configured to move at a pose parallel to a longitudinal direction of the pitch link; and
   a connection link configured to connect the pitch link and the parallel link and
   the translation link is installed to translationally move along a guide provided in the parallel link,
the positioning arm further comprising:
   a center bevel gear fixed to the base;
   a pair of rotary bevel gears engaged to both sides of the center bevel gear to be rotatable with respect to the gear case; and
   a pair of rotating bodies fixed to the pair of rotary bevel gears to rotate together with the pair of rotary bevel gears with respect to the gear case.

2. The positioning arm of claim 1, wherein the gravity torque compensator comprises:
a pair of elastic bodies having a length changing in response to the roll-rotation or the pitch-rotation of the link assembly to provide an elastic force for generating the compensation torque.

3. A positioning arm comprising:
a link assembly comprising a translation link configured to translationally move along a virtual axis passing a remote center of motion (RCM) present at a predetermined position separated from one point, and configured to move in at least two directions based on the one point; and
a gravity torque compensator configured to provide a compensation torque in a direction opposite to a gravity torque applied to the one point by a self-weight of the link assembly,
wherein the link assembly is configured to perform a roll-rotation and a pitch-rotation and, irrespective of a roll-rotation angle and a pitch-rotation angle, translationally move along the virtual axis along which the translation link passes the RCM,
wherein the link assembly further comprises:
   a gear case configured to perform a roll-rotation with respect to a base;
   a pitch link configured to perform a pitch-rotation with respect to the gear case;
   a parallel link configured to move at a pose parallel to a longitudinal direction of the pitch link; and
   a connection link configured to connect the pitch link and the parallel link and
   the translation link is installed to translationally move along a guide provided in the parallel link,
the positioning arm further comprising:
   a center bevel gear fixed to the base;
   a pair of rotary bevel gears engaged to both sides of the center bevel gear to be rotatable with respect to the gear case; and
   a pair of rotating bodies fixed to the pair of rotary bevel gears to rotate together with the pair of rotary bevel gears with respect to the gear case,
wherein a connecting shaft portion is provided between the pair of rotary bevel gears and the pair of rotating bodies corresponding thereto, and
the link assembly is installed in the connecting shaft portion to be rotatable in one direction.

4. A positioning arm comprising:
a link assembly comprising a translation link configured to translationally move along a virtual axis passing a remote center of motion (RCM) present at a predetermined position separated from one point, and configured to move in at least two directions based on the one point; and
a gravity torque compensator configured to provide a compensation torque in a direction opposite to a gravity torque applied to the one point by a self-weight of the link assembly,
wherein the link assembly is configured to perform a roll-rotation and a pitch-rotation and, irrespective of a roll-rotation angle and a pitch-rotation angle, translationally move along the virtual axis along which the translation link passes the RCM,
wherein the link assembly further comprises:
   a gear case configured to perform a roll-rotation with respect to a base;
   a pitch link configured to perform a pitch-rotation with respect to the gear case;
   a parallel link configured to move at a pose parallel to a longitudinal direction of the pitch link; and
   a connection link configured to connect the pitch link and the parallel link and
   the translation link is installed to translationally move along a guide provided in the parallel link,
the positioning arm further comprising:
   a center bevel gear fixed to the base;
   a pair of rotary bevel gears engaged to both sides of the center bevel gear to be rotatable with respect to the gear case; and
   a pair of rotating bodies fixed to the pair of rotary bevel gears to rotate together with the pair of rotary bevel gears with respect to the gear case,
wherein the pair of rotary bevel gears are configured to rotate in an opposite direction about a same axis when the link assembly performs the roll-rotation instead of relatively moving when the link assembly performs the pitch-rotation.

5. A positioning arm comprising:
a link assembly comprising a translation link configured to translationally move along a virtual axis passing a remote center of motion (RCM) present at a predetermined position separated from one point, and configured to move in at least two directions based on the one point; and
a gravity torque compensator configured to provide a compensation torque in a direction opposite to a gravity torque applied to the one point by a self-weight of the link assembly,
wherein the link assembly is configured to perform a roll-rotation and a pitch-rotation and, irrespective of a roll-rotation angle and a pitch-rotation angle, translationally move along the virtual axis along which the translation link passes the RCM,
wherein the link assembly further comprises:
   a gear case configured to perform a roll-rotation with respect to a base;
   a pitch link configured to perform a pitch-rotation with respect to the gear case;

a parallel link configured to move at a pose parallel to a longitudinal direction of the pitch link; and
a connection link configured to connect the pitch link and the parallel link and
the translation link is installed to translationally move along a guide provided in the parallel link,
the positioning arm further comprising:
a center bevel gear fixed to the base;
a pair of rotary bevel gears engaged to both sides of the center bevel gear to be rotatable with respect to the gear case; and
a pair of rotating bodies fixed to the pair of rotary bevel gears to rotate together with the pair of rotary bevel gears with respect to the gear case,
wherein the gravity torque compensator comprises:
a pair of elastic bodies having a length changing in response to the roll-rotation or the pitch-rotation of the link assembly to provide an elastic force for generating the compensation torque,
wherein the gravity torque compensator further comprises:
a support located at one side of the pair of elastic bodies;
a pair of sliders located at another side of the pair of elastic bodies to be slidable with respect to the pitch link; and
a pair of compensation steel wires having one sides fixed to the pair of rotating bodies and the other sides fixed to the pair of sliders.

6. The positioning arm of claim 5, further comprising:
a gravity torque adjuster configured to reduce a difference between the compensation torque and the gravity torque generated based on a translation distance of the translation link.

7. The positioning arm of claim 6, wherein the support comprises:
a support portion disposed beside a path on which the pair of compensation steel wires pass, to function as a portion receiving the compensation torque from the pair of compensation steel wires and
the gravity torque adjuster is configured to reduce a length of a moment arm of the compensation torque by lowering the support when the translation link translationally moves toward the RCM, and increase the length of the moment arm of the compensation torque by elevating the support when the translation link translationally moves in a direction in which a distance between the translation link and the RCM increases.

8. The positioning arm of claim 7, wherein the support is installed to be slidable with respect to the pitch link and
the gravity torque adjuster comprises:
an adjusting steel wire configured to mutually connect the translation link and the support to slidingly move the support when the translation link translationally moves.

9. The positioning arm of claim 8, wherein the gravity torque adjuster further comprises:
a transmission configured to increase and reduce a sliding distance of the support moving relative to the pitch link in proportion to the translation distance of the translation link moving relative to the parallel link.

10. The positioning arm of claim 9, wherein the adjusting steel wire comprises:
a first adjusting steel wire and a second adjusting steel wire connected to one side and another side of the transmission and
the transmission comprises:
a first reel around which the first adjusting steel wire is wound;
a second reel around which the second adjusting steel wire is wound; and
a reducer configured to allow the second reel to rotate with respect to the first reel at a set rotation ratio.

11. A positioning arm comprising:
a link assembly comprising a translation link configured to translationally move along a virtual axis passing a remote center of motion (RCM) present at a predetermined position separated from one point, and configured to move in at least two directions based on the one point;
a gravity torque compensator configured to provide a compensation torque in a direction opposite to a gravity torque applied to the one point by a self-weight of the link assembly, and
a gravity torque adjuster configured to reduce a difference between the compensation torque and the gravity torque generated based on a translation distance of the translation link.

12. A positioning arm comprising:
a link assembly configured to perform a roll-rotation and a pitch-rotation and comprising a translation link configured to translationally move along a virtual axis passing a remote center of motion (RCM) present at a predetermined position separated from one point;
a plurality of bevel gears configured to engagingly rotate when the link assembly performs the roll-rotation instead of relatively moving when the link assembly performs the pitch-rotation;
a rotating body connected to at least one of the plurality of bevel gears to rotate together with a corresponding bevel gear; and
a gravity torque compensator connected to the rotating body and configured to provide a compensation torque in an opposite direction with respect to a gravity torque applied by self-weight of the link assembly, by deforming an elastic body in response to the roll-rotation and the pitch-rotation of the link assembly.

13. The positioning arm of claim 12, further comprising:
a gravity torque adjuster configured to reduce a difference between the compensation torque and the gravity torque by increasing or reducing a length of a moment arm of the compensation torque in response to the translation link moving translationally.

* * * * *